United States Patent [19]
LeBlanc

[11] 3,712,514
[45] Jan. 23, 1973

[54] PORTABLE BEER DISPENSER
[76] Inventor: Robert B. LeBlanc, 15411 Englewood Ave., Allen Park, Mich. 48101
[22] Filed: March 29, 1971
[21] Appl. No.: 128,791

[52] U.S. Cl...............222/146 C, 222/176, 222/399
[51] Int. Cl. ..............................................B67d 5/62
[58] Field of Search.......222/131, 146 C, 399, 400.7, 222/400.8, 176

[56] References Cited

UNITED STATES PATENTS 3,232,489   2/1966   Buffington ...................222/146 C X
2,085,274   6/1937   Rutt et al..........................222/399 X
2,048,665   7/1936   Dolan et al. ...................222/400.7 X
3,180,529   4/1965   Buffington ....................222/146 C X Primary Examiner—Robert B. Reeves
Assistant Examiner—Larry Martin
Attorney—Benjamin W. Colman

[57] ABSTRACT

The invention provides a refrigerated compartment for a keg of beer, a compartment for housing a refrigeration system operatively connected with the refrigeration compartment, an air compressor system including a surge tank, and a tank of carbon dioxide, each cooperatively connected to the keg of beer for charging the same under pressure. The entire assembly is unitized into a movable carrier and is further provided with a manually-operated discharge faucet for serving beer from the keg.

12 Claims, 5 Drawing Figures

PATENTED JAN 23 1973

INVENTOR.
ROBERT B. LEBLANC

BY

ATTORNEY

INVENTOR.
ROBERT B. LEBLANC

ATTORNEY

PORTABLE BEER DISPENSER

The invention relates to a portable movable beer dispensing unit having a refrigerated compartment for a keg of beer, a compartment housing an air compressor and a surge tank, a tank of carbon dioxide under pressure, and refrigeration mechanism connected to the refrigerated compartment, conduit means connecting the pressurized gases to the beer keg. A suitable manually-operated valve is disposed in the conduits leading from each gas tank for manual selection of the gas desired for charging the keg of beer. The refrigeration system and components are generally conventional in construction. The motor drives for the refrigeration and air compressors are conductor-connected to a single electrical plug adapted to be removably connected to a source of electric power for the motors.

Thus, when the refrigeration compartment housing the keg of beer has reached the desired chill level, and the surge tank has been suitably charged with air to a predetermined pressure level, automatic switches in the conductors leading to each of the motors serving and driving the refrigeration and air compressors are automatically opened to shut off further operation of each compressor. The electrical conductor line takes a Y-form with the required control switches in each branch of the Y.

Draft beer is served from kegs, the beer being prepared somewhat differently and, therefore, having a taste and flavor different from bottle beer. Most people prefer draft or keg beer because the flavor is smoother, a finer "head" appears when the beer is drawn, and the taste is generally superior to that of bottle beer. However, it has always been a problem in restaurants to serve draft beer, including drawing the beer and serving it while still at the preferred chill temperature and in time to maintain the foamy "head" above the liquid beer in the glass.

The instant invention provides a practical, efficient, and inventive structure for serving keg or draft beer. Such kegs are usually maintained in a refrigerated storage chamber until required for use. To maintain the beer at the proper temperature, the refrigeration compartment of the portable unit of this invention is chilled when the keg of beer is inserted and connected to the drawing tap and to the gas tank conduit. The entire unit is mounted upon rolling wheels and can be readily moved, after disconnection of the power conductor to the compressor motors, to any part of a restaurant for serving draft beer to patrons directly at their tables. This service, to applicant's knowledge, has never been provided before.

It is an object of the invention to provide a portable, movable, rolling-type beer dispensing device. Another object is to provide such a beer dispenser having a refrigeration compartment for a keg of beer, the temperature of the compartment being thermostatically controlled through a switch operatively associated with an electrical refrigerator system. A further object is to provide such a beer dispensing unit housing a compressed gas tank conduit-connected to the keg of beer disposed in the refrigeration compartment. Still another object is to provide the electrical and mechanical components serving the refrigeration compartment and the keg of beer in a second compartment of the movable unit. Yet another object is to provide a portable movable beer dispensing unit of relatively low cost and high efficiency for service of draft or keg beer at tables or stations in various areas of a restaurant, bar, lounge, or other food and drink service establishment.

Various further and more specific objects, features and advantages of the invention will appear from the description given below, taken in connection with the accompanying drawings, illustrating by way of example a preferred form of the invention. Reference is here made to the drawings annexed hereto and forming an integral part of this specification, in which FIG. 1 is a perspective view of one form of a portable movable beer dispensing unit embodying the inventive concept.

Figure 1:
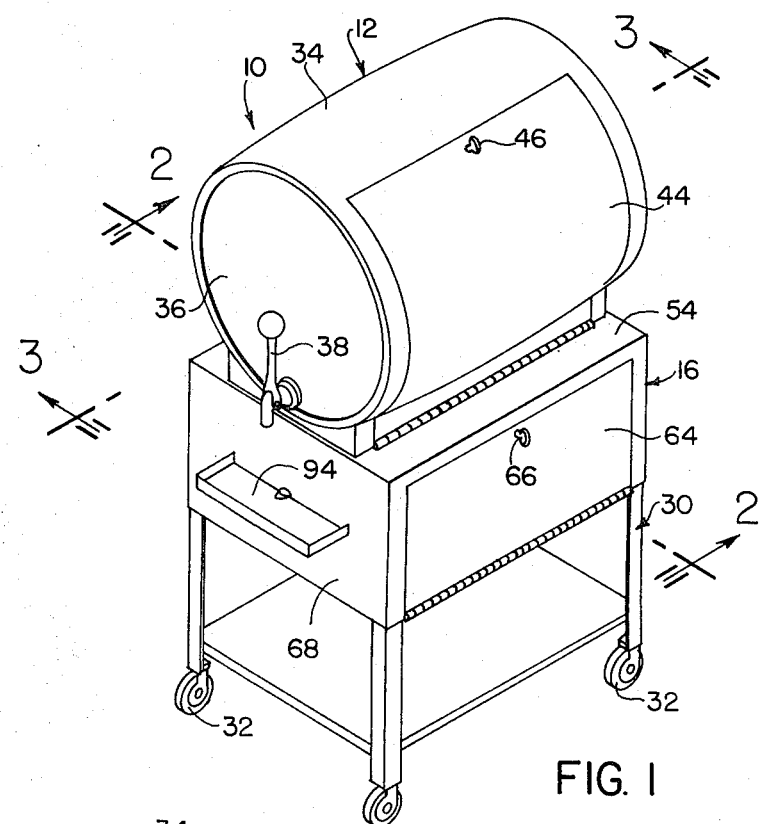
Figure 2:
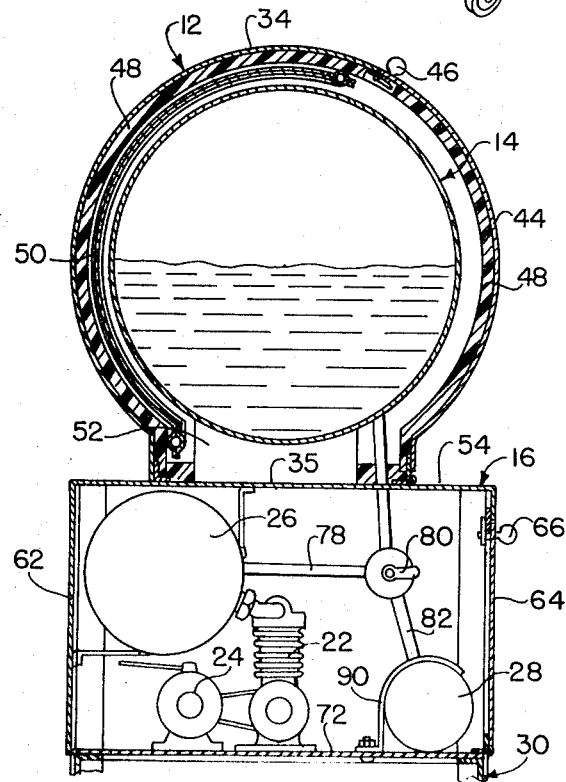
FIG. 2 is a transverse vertical sectional view of the unit illustrated in FIG. 1 taken substantially on the line 2—2 of FIG. 1.
Figure 3:
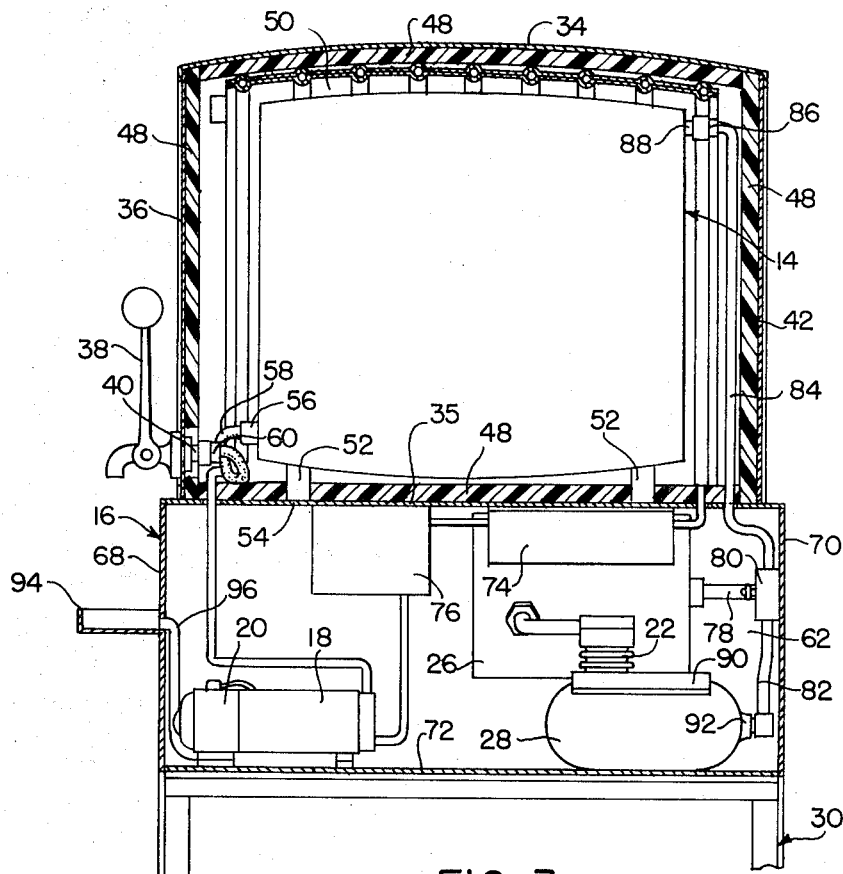
FIG. 3 is a longitudinal vertical sectional view taken substantially on the line 3—3 of FIG. 1.

As illustrated in the several views of the drawings, the portable movable beer dispensing unit 10 comprises the refrigeration compartment 12 housing the keg of beer 14, the components compartment 16 housing the refrigeration compressor 18 and its motor 20, the air compressor 22 and its motor 24, the surge tank 26, and the carbon dioxide tank 28. Framing 30 is secured to and supports the two compartments thereabove and is provided with wheels or castors 32 for rolling the unit from place to place as desired.

The refrigeration compartment 12 comprises a housing wall 34, a floor plate 35, a front wall 36 supporting a manually operable beer tap assembly 38 secured to the wall and having a conduit section 40 extending inwardly of the compartment, a rear wall 42, and a hinged door 44 provided with a latch 46 to secure the door to the wall 34. The compartment 12 is further provided with insulation 48 on all interior surfaces of the exterior walls, door, and floor plate of the compartment 12. Inwardly of the insulation, in the area of the housing wall 34, is an evaporator system 50 of refrigeration gas conductors or plate coils adapted to extract heat from the interior of the compartment and chill the keg of beer 14 therewithin. The plate coils are conduit connected to the refrigeration generator or compressor 18 disposed in the components compartment 16. The keg of beer 14 is supported upon a pair of cradle blocks 52,52 secured to the floor plate 35 of the refrigeration compartment. This floor plate may also serve as the top wall plate 54 of the components compartment 16, or it may be a separate member should each compartment be made independently of the other.

The keg of beer is provided with a discharge fitting 56 to which is removably secured a relatively flexible conduit 58 having manually operable slip type couplings 60 at each end thereof for removable attachment to the faucet conduit 40 and the keg fitting 56.

The housing of components compartment 16 comprises the top plate 54, a rear wall 62, a hinged front door 64 having a key latch 66 to secure the door in closed position, end walls 68,70, and a bottom floor plate 72.

Suitably arranged and disposed within the compartment 16 is the refrigeration generator or compressor 18, its motor 20, the gas condenser 74, and liquid refrigeration chamber 76 conduit connected to the plate coils 50 suitably arranged within the refrigeration compartment 12.

Also disposed within compartment 16 is the air compressor 22, its drive motor 24, and the air surge tank 26 connected by conduit 78 to the three-way valve 80, to which the carbon dioxide tank 28 is also connected by the conduit 82. The manually operable three-way valve 80 communicates with the keg 14 by way of conduit 84 terminating at its distal end in the slip coupling 86 removably attachable to the fitting 88 at the keg end.

The pressurized carbon dioxide cylinder or tank 28 is disposed upon the floor plate 72, or at any other desired or suitable position, and is secured thereto by the clamping plate member 90. The tank 28 is provided with a discharge fitting 92 to which conduit 82 is removably attached and connected.

Figure 4:
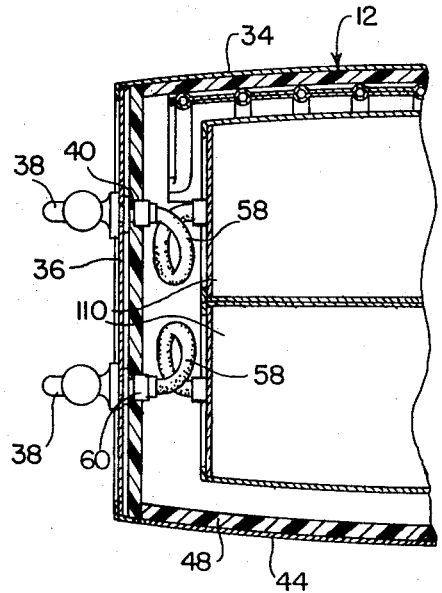
FIG. 4 is a fragmentary longitudinal horizontal sectional view of the forward portion of the refrigeration compartment holding a plurality of beverage containers.

As more particularly illustrated in the electrical wiring diagram of FIG. 4, the electrical system comprises a main conductor 94 provided with a connector plug 96 at the distal end thereof. The conductor 94 is connected to the branching conductors 98 connected to the air compressor motor 24 and 100 connected to the refrigeration compressor motor 20. Branch conductor 98 connects to a pressure control switch 102 which is responsive to a pressure control device 104, of suitable characteristics, actuated by the pressure in the surge tank 26. Branch conductor 100 is connected to a thermostatic control switch 106 which is responsive to a thermostatic control device 108 disposed within the refrigeration compartment 12 for signalling changes in the compartment temperature within predetermined limits.

The portable movable beer dispensing unit 10 operates and functions as follows. A keg of beer 14, which may or may not be pre-chilled according to the operator's preference, is placed upon the cradle supports 52,52 within the refrigeration compartment 12 through the door 44 which is then closed upon the keg. When the conductor plug 96 is connected to a source of suitable electric power for the refrigeration and air compressor motors 20 and 24, the refrigeration system and the air compression system go into operation to chill the compartment 12 and fill the surge tank 26 with air to the desired chill temperature and air pressure, respectively.

The preferred chill temperature for beer is approximately 40° to 42° F., and the preferred range of air pressure in the surge tank 26 is from about 25 to 40 psi. Sometimes carbon dioxide is preferred in place of compressed air for the reason that carbon dioxide appears to enhance the flavor of the beer, while, in certain instances, air drawn from the environment surrounding the air compressor picks up the odors of the environment and passes them through the compressor into the surge tank. These odors are then discharged into the keg of beer, sometimes affecting the odor and flavor of the beer. This objection is not present when pressurized carbon dioxide is used.

When the desired chill temperature is reached in the compartment 12, the thermostatic control device 108 signals the presence of that temperature to the control switch 106 opening the circuit to the refrigeration compressor motor 20 and shutting off current to the motor. When the air pressure in the surge tank reaches the desired predetermined pressure, the pressure control device 104 signals the presence of that pressure to the pressure control switch 102, opening the electrical circuit to the conductor motor 24 and shutting off current to that motor.

When the dispensing unit 10 is required for service, plug 94 is disconnected from the source of electrical power and is stored in any suitable manner in the unit or at one side of the unit. The device 10 is then rolled to the point of service in the restaurant, lounge or other food service center. Beer is drawn from the keg 14 through the manually operated tap or dispensing valve 38 into glasses, mugs or other vessels and served to patrons.

A suitable drip catch pan may also be provided under the tap 38 to catch drippings from the tap or overflow from the vessels and carry the same by a drain pipe into a suitable collecting device (not shown).

Figure 5:
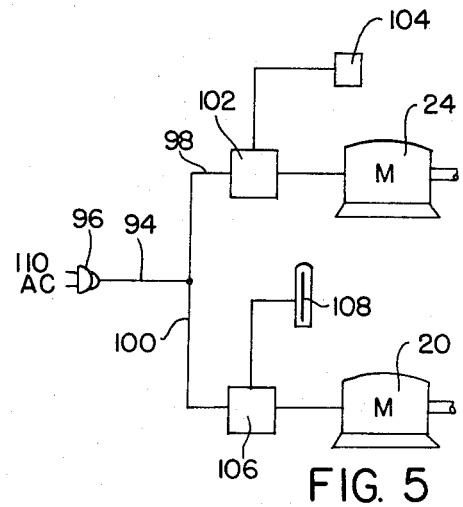
FIG. 5 is a diagrammatic view of the electrical system serving the compressor motors utilized in the dispensing unit.

The inventive construction can be arranged with a plurality of beverage containers in the refrigeration compartment, wherein a tap or dispensing valve is provided for each separate beverage, the pressurized gas being conduit-connected to each container in parallel. The dispensing device 10 as illustrated in FIG. 5 holds a plurality of beverage containers 110,110 within the refrigeration compartment 12. Each container is connected by a conduit 58 to a tap fitting 40 for selected dispensing of the beverage container therein by the tap 38. Each container is also connected by a conduit 84 to the valve 80 for selective admission of compressed air or compressed carbon dioxide gas to the containers. Thus, two types of beers can be served at tables to patrons, or a beer and a wine may be served, or other beverages as indicated below may be dispensed from the unit 10.

It is considered feasible to utilize the inventive construction with such wines as the carbonated wines like champagne and cold duck, and with white wines. Root beers and carbonated soft drink beverages may also be dispensed from the unit.

Each of the refrigeration and components compartments may be fabricated independently of the other and conjoined together in any suitable manner. For instance, the components compartment can be positioned above the refrigeration compartment instead of as illustrated and described herein. The tap 38, removably connected to the keg of beer, can be placed above either compartment to dispense beer from a fixed support or a pseudo or simulated keg. A number of different arrangements of the elements of this invention can be made according to the styling desired.

Although a particular preferred form or embodiment of the invention has been disclosed herein for purposes of explanation, further modifications or variations thereof, after study of this specification, will or may become apparent to those skilled in the art to which the invention pertains. Reference should be had to the appended claims in determining the scope of the invention.

I claim:

1. A unitary portable translatable beverage dispensing unit comprising
a first compartment housing at least one container of beverage to be dispensed, a manually operable beverage dispensing valve mounted on the exterior of said first compartment and conduit connected to said beverage container for dispensing said beverage,
first conduit means for connecting said dispensing valve to said beverage container,
a second compartment disposed below said first compartment and housing refrigeration means for maintaining the interior of said container housing compartment at a below-ambient temperature and communicating therewith,
an evaporator disposed in said first compartment for chilling said container of beverage and communicating with said refrigeration means in said second compartment,
a source of pressurized gas housed in said second compartment at ambient and above ambient temperatures and conduit connected to said beverage container,
second conduit means for connecting said gas source to said beverage container,
and movable framing supporting said two compartments, dispensing valve, refrigeration means, pressurized gas source, and first and second conduit means, as a unit.

2. The dispensing unit defined in claim 1, wherein said compartment houses a plurality of beverage containers.

3. The dispensing unit defined in claim 2, wherein said first conduit means comprises a plurality of conduit means for connecting each of said beverage containers to a dispensing valve.

4. The dispensing unit defined in claim 2, wherein said second conduit means comprises a plurality of conduit means for connecting each of said beverage containers to said gas source.

5. The dispensing unit defined in claim 1, wherein valve means is provided in said second conduit means for selectively admitting said pressurized gas to said beverage container.

6. The dispensing unit defined in claim 1, wherein said source of pressurized gas comprises a surge tank containing air under pressure, and means for compressing air and communicating with said surge tank to supply the same with compressed air.

7. The dispensing unit defined in claim 1, wherein said source of pressurized gas comprises a tank of carbon dioxide gas under pressure.

8. The dispensing unit defined in claim 1, wherein said source of pressurized gas comprises a surge tank containing air under pressure, and a tank of carbon dioxide gas under pressure.

9. The dispensing unit defined in claim 9, wherein valve means is provided in said second conduit means for selectively admitting pressurized gas alternatively from said surge tank of pressurized air or said tank of pressurized carbon dioxide.

10. The dispensing unit defined in claim 9, wherein said refrigeration means includes a first electric motor,
said source of pressurized gas comprises means for compressing gas and includes a second electric motor, said electric motors being energized through a conductor removably connectable to a source of electric power.

11. The dispensing unit defined in claim 13, wherein said conductor is arranged in a circuit having a first branch to said refrigeration means motor and a second branch to said air compressor motor,
thermostatic control means in said first compartment signalling a requirement for a reduction in the first compartment temperature, and a switch in said first branch connected to said control means and responsive thereto to alternately open and close said first circuit branch to said refrigeration means motor, and pressure responsive control means communicating with and connected to the chamber of said surge tank signalling a requirement for air compressed to a predetermined limit,
and a switch in said second branch connected to said latter control means and responsive thereto to alternately open and close said second circuit branch to said air compressor motor.

12. The dispensing unit defined in claim 1, wherein said dispensing valve is secured to a wall of said first compartment and comprises a valve portion and outlet disposed exteriorly of said compartment and a conduit portion disposed interiorly of said compartment for connection to said first conduit means.

* * * * *